United States Patent
Bohler et al.

(10) Patent No.: US 6,398,389 B1
(45) Date of Patent: Jun. 4, 2002

(54) SOLID STATE LIGHT SOURCE AUGMENTATION FOR SLM DISPLAY SYSTEMS

(75) Inventors: Christopher L. Bohler, Allen; Frank J. Poradish, Plano; Claude E. Tew, Dallas, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/728,522

(22) Filed: Dec. 1, 2000

Related U.S. Application Data

(60) Provisional application No. 60/168,696, filed on Dec. 3, 1999.

(51) Int. Cl.[7] .................................................. F21V 9/00
(52) U.S. Cl. ........................ 362/293; 362/268; 362/242; 362/228
(58) Field of Search ................................. 362/293, 231, 362/228, 242, 268

(56) References Cited

U.S. PATENT DOCUMENTS

| | | | | |
|---|---|---|---|---|
| 5,459,547 A | * | 10/1995 | Shiozawa | 355/67 |
| 5,797,674 A | * | 8/1998 | Nagayama | 362/268 |
| 6,092,901 A | * | 7/2000 | Hashizume et al. | 362/19 |
| 6,220,710 B1 | * | 4/2001 | Raj et al. | 353/20 |

* cited by examiner

Primary Examiner—Sandra O'Shea
Assistant Examiner—Ali Alavi
(74) Attorney, Agent, or Firm—Charles A. Brill; Wade James Brady, III; Frederick J. Telecky, Jr.

(57) ABSTRACT

In an SLM-type display system, a solid state light source can be used to augment a lamp light source in a least two different ways. First, a solid state source can be used to augment deficiencies in a particular spectral region. Typically, lamps are deficient in red, and a red solid state source would be used. However, the same concept applies to augmenting any color region. Multiple solid state sources could be used to augment more than one region. Second, when the SLM system uses a color wheel, a solid state source can be used to eliminate "spoke loss". Multiple solid state sources can be used for providing different colors during the spokes.

23 Claims, 4 Drawing Sheets

SOLID STATE LIGHT SOURCE AUGMENTATION FOR SLM DISPLAY SYSTEMS

This application claims priority under 35 USC § 119(e)(1) of provisional application number 60/168,696 filed Dec. 3, 1999.

TECHNICAL FIELD OF THE INVENTION

This invention relates to image displays, and more particularly to methods of augmenting white light filtered through a color wheel, or colored lamp light, and used to illuminate the display.

BACKGROUND OF THE INVENTION

Spatial light modulators (SLMs) have found application in many fields, a significant one of which is image displays. In general, an SLM is an array of light-emitting, light-transmitting, or light-reflecting elements, which are individually addressable, usually with electronic signals. Many SLMs are binary, having an addressing scheme that switches its elements to either an "on" or "off" state to form the image. A characteristic of SLMs is that there is no scanning—all pixels are activated at substantially the same time to generate the entire image or a two-dimensional block of the image, depending on the size of the image and the SLM.

One type of SLM is a digital micro-mirror device (DMD), also known as the digital light processor (DLP), manufactured by Texas Instruments Incorporated. The DMD has an array of thousands of tiny tilting mirrors. To permit the mirrors to tilt, each is attached to one or more hinges mounted on support posts and each is spaced by means of an air gap over underlying addressing circuitry. The addressing circuitry provides electrostatic forces, which cause each mirror to selectively tilt.

For display applications, the DMD is addressed with image data. In accordance with this image data, light is selectively reflected either into a projection pupil or into a "dump". The combination of light and dark mirrors projected onto a viewing screen forms an image. Modulation techniques are used to provide greyscale image "frames". A quick succession of frames is perceived by the viewer as a full motion display.

There are at least two approaches to generating color displays with the DMD display system. One approach is to generate multiple images with multiple SLMs, typically one SLM each for red, green and blue. Each image has a desired intensity, and the images are combined to result in the correctly colored display. A second approach is to use a single SLM and generate images for each color (red, green, and blue) sequentially. A white light source is filtered through a revolving color wheel, such that a desired color illuminates the corresponding image. The differently colored images are generated so quickly that the eye integrates them into the correctly colored frame.

An issue with lamps used in display systems is that they tend to be deficient in the red spectrum of the visible light region. This limits the number of lumens that can be projected onto a viewing screen while maintaining esthetically pleasing color balance.

SUMMARY OF THE INVENTION

One aspect of the invention is an illumination system for a spatial light modulator that is illuminated with light from a color wheel and sequentially displays differently colored images. In one embodiment, the solid state light source is "forward" of the color wheel, relative to a white light source. The white light source, such as a lamp, provides white light in the visible spectrum. A solid state light source augments the white light by providing light in a desired spectral region. A beam combiner overlays the light from the white light source with the light from the solid state light source. This combined beam is focused through the color wheel, which has multiple color segments for filtering the light. Various timing alternatives may be implemented such that the augmentation is during the complete revolution of the color wheel or only during part of each revolution. Various lens and mirrors may be used to focus the light from the white light source and the light from the solid state light source along an optical path to the spatial light modulator.

In other embodiments, the solid state light source may be "behind" the color wheel. Also, in each embodiment, multiple solid state light sources could be used to augment different colors.

An advantage of the invention is that it can be used to provide good color balance in displays generated with a color wheel display system. For example, solid state illumination can be used to augment red lamp illumination without throwing away blue and green lamp illumination. Additionally, a solid state source can be used to compensate light loss during transitions between segments of the color wheel. In sum, the solid state source enhances picture quality, without adding undue expense or complexity to the display system.

The high switching speeds and longevity of solid state sources make them a good supplement to any lamp source in an SLM display system, whether the lamp be a white light lamp in a color wheel system (sequential colored images) or a color lamp in a multiple SLM (concurrent colored images) system.

DETAILED DESCRIPTION

Color Wheel Display System with Solid State Augmentation for Lamp Deficiency

The following description is in terms of a SLM-type display system that uses a color wheel to filter "field sequential" images. As described in the Background, with each image frame, the color wheel filters white light so as to illuminate the SLM with differently colored light. This permits the SLM to generate a sequence of differently colored images, which are perceived by the viewer as a correctly colored display.

Figure 1:
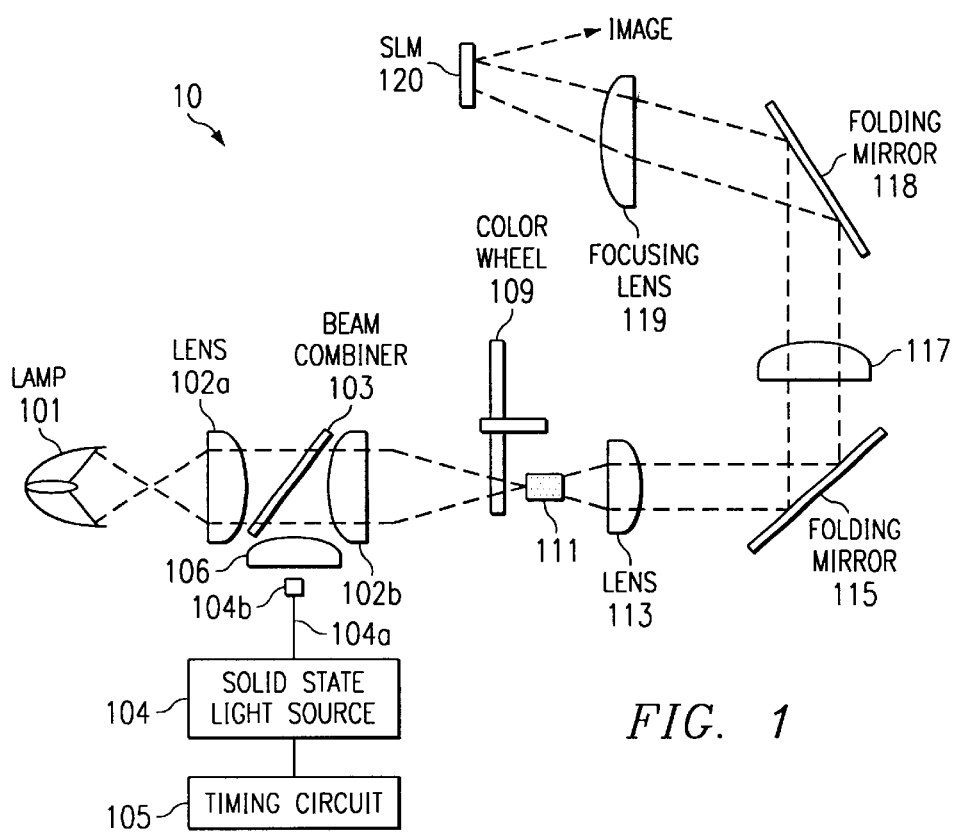
FIG. 1 illustrates a portion of a SLM-based display system, namely the SLM and the optical components used to illuminate the SLM, having solid state augmentation in accordance with the invention.

FIG. 1 illustrates a portion of the display system 10, namely the SLM 120 and the optical elements that provide light to be reflected from the SLM 120. These optical elements are referred to herein as the "illumination system" 10, and include elements that provide solid state light augmentation in accordance with the invention.

The SLM of FIG. 1 is a DMD type SLM, which as explained in the Background, reflects light it receives out of the color wheel 109. Thus, the particular optical path described herein is configured for a reflective type SLM. However, the optical path, with its mirrors and lenses, could be rearranged for other types of SLMs.

Furthermore, the particular optical path of FIG. 1 is designed to provide a compact design. For example, the two mirrors 115 and 118 serve to fold the optical path. However, in essence, the illumination system 10 provides an optical path from a white light source 101 to the SLM 120. Along this path, the white light is filtered with a color wheel 109 and augmented with at least one solid state illumination source 104.

The white light source is implemented with lamp 101. Examples of suitable lamps are arc lamps and metal halide lamps. A possible alternative might be a solid state white light source, such as a white light LED (light emitting diode), provided its intensity is sufficient.

The light from lamp 101 is focussed through the color wheel 109 using a condensing lens pair, which is comprised of a collimating lens 102a and a focussing lens 102b.

Solid state light source 104 provides red, green, or blue augmentation. In the example of this description, light source 104 is a red light source to compensate for deficiencies of lamp 101 in the red spectral region. However, augmentation could be provided for other spectral regions.

In the example of FIG. 1, solid state source 104 is a fiber-coupled laser diode. A laser diode 104 is coupled to lens 105 using optical fiber 104a and an optical coupler 104b. Other examples of a suitable solid state source 104 are LEDs, vertical cavity surface emitting lasers, or superlumiscent diodes. Two examples of alternative solid state light sources are discussed below in connection with FIGS. 3 and 4.

The light beams from lamp 101 and solid state source 104 are combined using a beam combiner 103. A lens 106 focuses the light from the solid state source 104 to beam combiner 103. After being combined, the beam from the solid state source 104 and the beam from lamp 101 follow the same path through lens 102b.

An example of a suitable beam combiner 103 is a dichroic beam combiner, which reflects the solid state light in the desired direction. It is "notched" to reflect a desired region of the light spectrum from solid state source 104. Typically, this spectrum is narrow relative to the corresponding color from lamp 101. For example, in the case of red augmentation, a red solid state source might provide a fairly narrow range, such as 620–650 nanometers. In comparison, the lamp 101 provides a broad red spectrum. The notch is sufficiently wide to ensure that a desired spectral region from solid state source 104 is combined with the lamp light. However, because the same range of lamp light will be reflected out of the light path, the notch is sufficiently narrow to limit this loss. In other words, the range of the notching permits the solid state light to be combined with the lamp beam, without undue loss of light from the lamp. Even though some red lamp light is lost, overall, the amount of red light is increased by the combination of light from the two sources.

Other examples of suitable beam combiners 103 are holographic beam combiners (HOEs) and gratings.

A solid state source timing circuit 105 (which may be part of a larger timing circuit), controls the on and off times of the solid state source. There are many possible timing alternatives. For example, a red solid state source 104 could be on continuously or on during only the red segment(s) of the color wheel. It might even be the case that color wheel 109 has a "clear" segment during which the solid state source 104 is on. An additional use of solid state source 104 to augment color wheel transitions, as well as lamp deficiency, is discussed below in connection with FIGS. 5A–6B.

Color wheel 109 has a motor and control electronics (not shown) that cause it to revolve at a pre-determined rpm rate. As a simple example, color wheel 109 has three segments, one red, one green, one blue. It revolves once for every frame generated by SLM 120 so that each color (red, green, or blue) is displayed for ⅓ of the frame time. Variations on this simple example include revolving the color wheel at n>1 times the frame time, and dividing the red, green, and blue segments into multiple non-contiguous segments. These variations are designed to reduce artifacts associated with "field sequential" color wheel displays.

After passing through color wheel 109, the light is integrated using integrator 111. This removes "hot spots" and provides a smooth light beam to be transmitted to the SLM 120.

A collimating lens 113 receives the output of integrator 111 and provides a collimated beam. This beam is reflected from a first folding mirror 115, passes through a relay lens 117, and is reflected from another folding mirror 118. As stated above, mirrors 115 and 118 are used to shape the light path into a compact path. A focussing lens 119 focuses the light on the surface of the SLM 120. A simpler design might simply use lens 113 to focus the light from the integrator onto the SLM 120.

Figure 2:
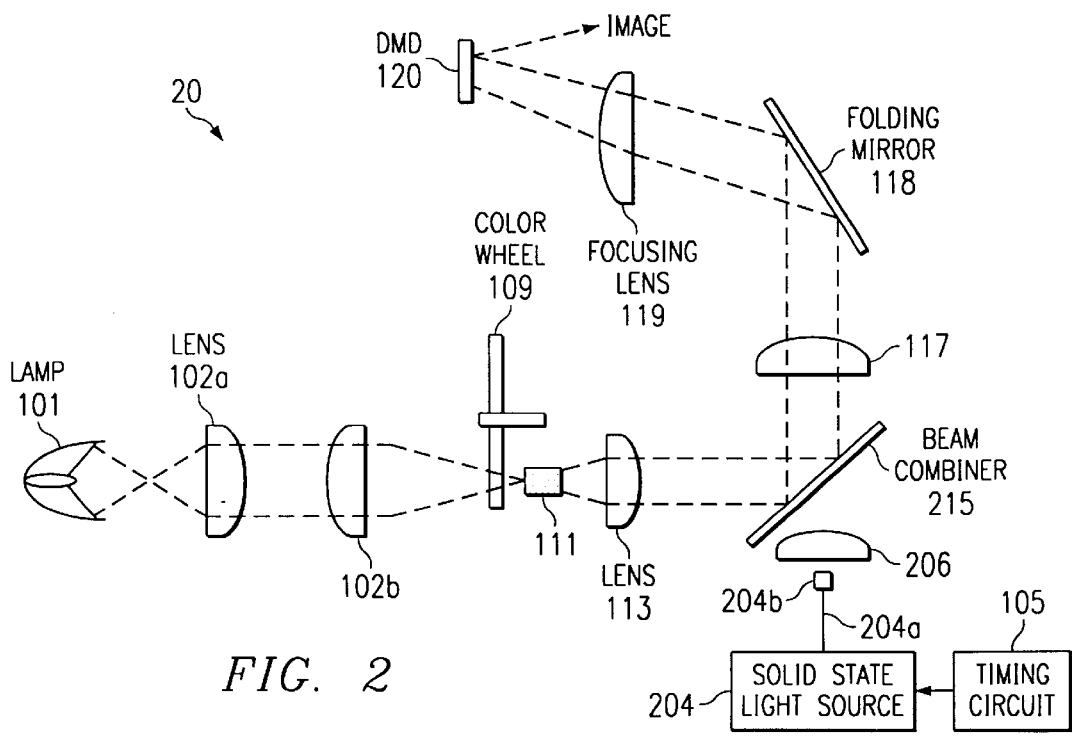
FIG. 2 illustrates the same system as FIG. 1 but with an alternative placement of the solid state source.

FIG. 2 illustrates the same system as FIG. 1, but with an alternative positioning of the solid state source. In the system 20 of FIG. 2, the solid state source 204 is "behind" the color wheel 109, relative to the lamp 101. A lens 205 focuses the solid state light to beam combiner 215. Beam combiner 215 combines the solid state light with the filtered light out of the color wheel 109 and integrator 111.

Figure 3:
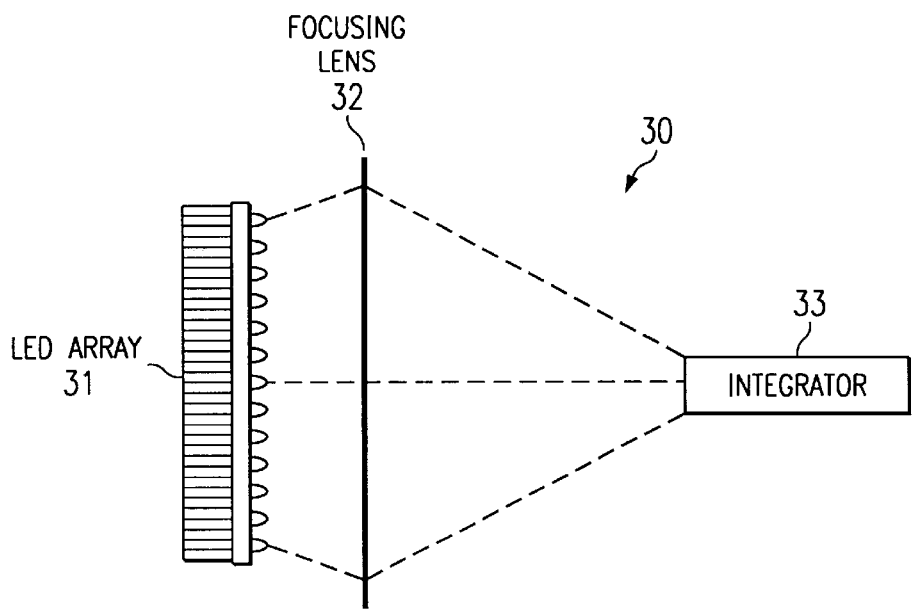
FIG. 3 illustrates an alternative embodiment of the solid state light source of FIGS. 1 or 2.

FIG. 3 illustrates an alternative embodiment of the solid state light source 104 or 204 of either FIG. 1 or FIG. 2, respectively. Instead of a fiber-coupled laser diode 104 (or 204), the light source 30 is an LED array 31. A focussing lens 32 focuses the light from array 31 to an integrator 33, which couples to lens 106 (or 206).

Figure 4:
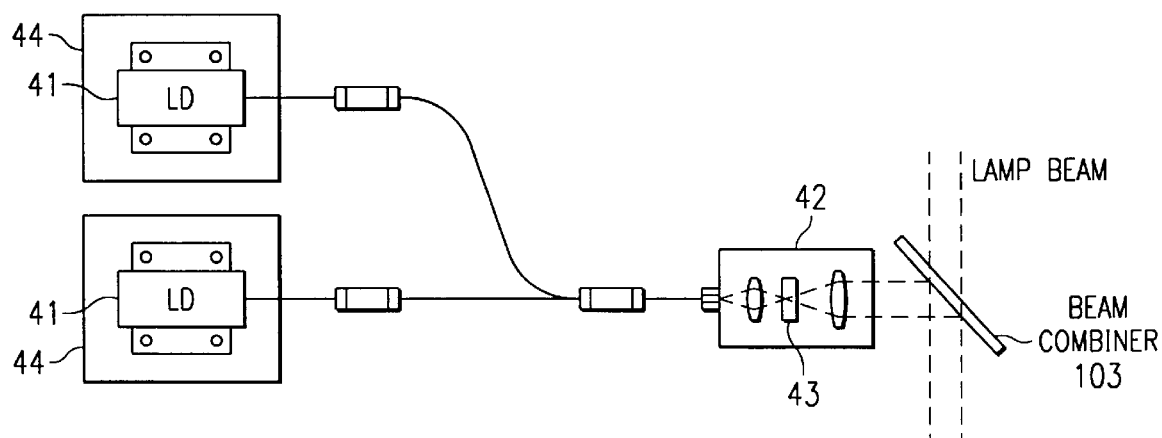
FIG. 4 illustrates a second alternative embodiment of the solid state light source of FIGS. 1 or 2.

FIG. 4 illustrates how multiple laser diodes (LDs) may be ganged to provide the solid state light source 104 (or 204). The laser diodes 41 are fiber optically connected to a telescope lens system 42 having a diffuser 43. The output of the diffuser 43 is combined with the beam from lamp 101 by beam combiner 103. If desired, heat sinks may be used to conduct heat from the laser diodes.

Although the above description is directed toward a system 10 or 20 having a single SLM and a color wheel, solid state light augmentation can also be used in multiple SLM systems. These include systems having two SLMS, one with a two-color color wheel and one for a third color. Systems having three SLMs use one SLM for each color.

When two or more SLMs are used, each SLM is simultaneously illuminated with a different color, and a combination of these images is displayed.

Typically, in a multiple SLM system, even when an SLM is dedicated to a single color and does not use a color wheel, the light source is a lamp. However, the addition of solid state light can ease the problem of overdriving the lamps. The illumination system for the SLM would be similar to that of FIGS. 1 and 2, but with the lamp providing only one color and with no color wheel. The solid state light source would be used to augment the lamp color.

Solid State Augmentation for Color Wheel Spoke Losses

Figure 5A:
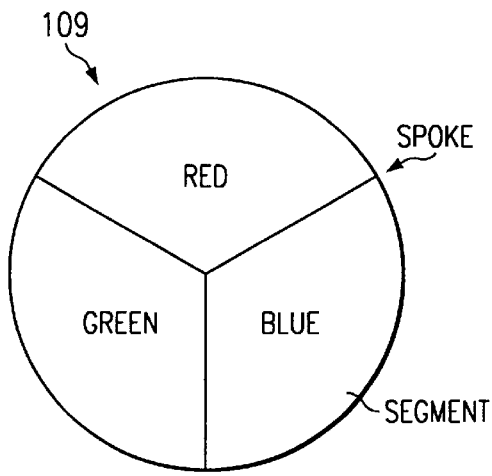
FIG. 5A illustrates a color wheel having one segment for each color.

FIG. 5A illustrates an example of color wheel 109. In the example of FIG. 5A, the color wheel 109 has only three segments, one for each color (red, green, and blue). The transitions between segments are referred to as "spokes". As explained in the Background, the use of a color wheel 109 is based on physiological traits that cause the viewer's eye to integrate sequentially colored images (red, green, and blue) as being a single image of the correct color. There are numerous "tricks" for enhancing the viewer's perception of image quality, such as by subdividing the segments or by spinning the wheel faster.

A problem to be dealt with when using a color wheel for motion displays is that the time between segments—the spoke time—is lost for purposes of illuminating the display. Various techniques may be used to reduce spoke artifacts, and in one approach, SLM 120 is simply turned off during transitions between color wheel segments. This results in diminished overall brightness.

Thus, although it is desirable to divide each segment into sub-segments, such division results in more spokes. Solid state light can be used to compensate for lost illumination resulting from the spokes.

A characteristic of solid state light sources, such as light source 104, is that they may be switched on and off very quickly. For LEDs and LDs, the switching time is virtually instantaneous. For this reason, a solid state source may be used with color wheel 109 to reduce spoke time losses. The off time of the solid state source can be precisely timed to begin or end at a color wheel transition so that it illuminates the SLM 120 during the transitions.

Figure 5B:
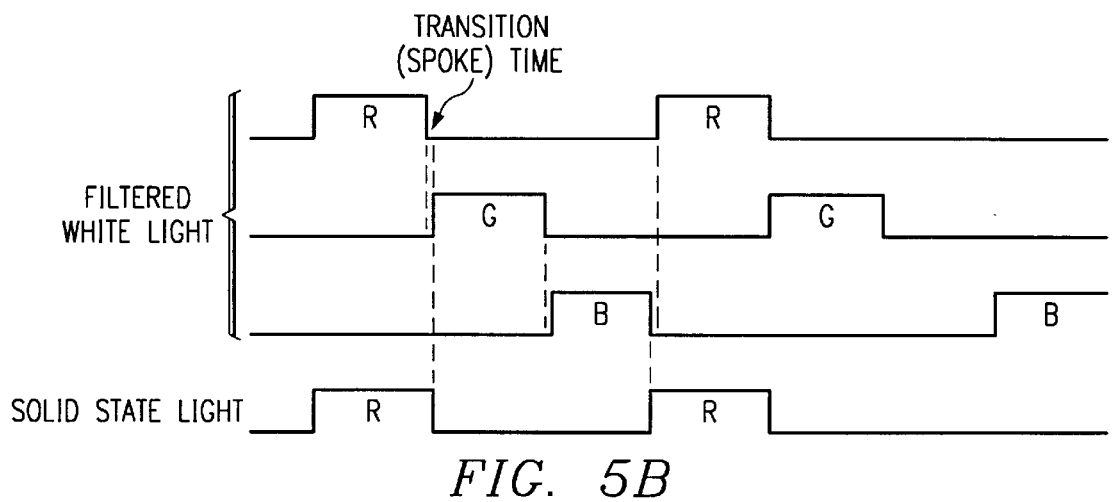
FIG. 5B illustrates the timing of the illumination provided by the color wheel of FIG. 5A, augmented with a solid state light source.

FIG. 5B illustrates the timing (at the SLM 120) of the illumination provided by the white light from lamp 101 through color wheel 109, as well as the illumination provided by the solid state source 204 of FIG. 2. The "on" times of the filtered white light illustrate the effect of the spokes. As indicated, there is a short period (exaggerated for purposes of illustration) of time during which the filtered white light illumination is lost.

However, because of the fast switching times of the solid state source 204, it may remain "on" until the transition to the next color is complete. In the example of FIG. 5B, a red solid state source is on during the whole "on" time of the red component of the white light and continues "on" during the color wheel transition to green. The solid state light source 204 is switched at the transition "edge". In this manner, the red-to-green spoke loss is compensated by the red solid state source.

In other embodiments, the solid state source could be on only during the transitions to red, or from red, or both. Or, the solid state source could be continuously on.

In practice, more than one solid state source could be used-for color wheel spoke compensation. For example, three solid state sources, one for each color could be used. Each solid state source would be associated with an appropriate lens and beam combiner to merge the solid state light onto the optical path. In the case of the blue and green solid state source, augmentation during the entire "on" time of the filtered light may not be necessary, and it may be desired to switch them on during only the transition time.

In some cases, it may be desirable to limit the "on" time of the solid state source, for example, to only the transition times. An advantage of reducing the total on time for the solid state source is that it may then be driven "harder", that is, with more current, without adverse effects on its longevity.

Figure 6A:
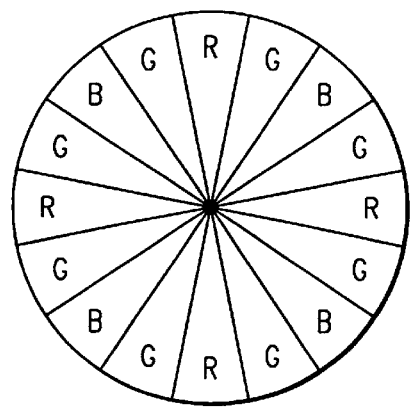
FIG. 6A illustrates a color wheel having multiple segments for each color.

FIG. 6A illustrates another embodiment of color wheel 109. In this embodiment, color wheel 109 has multiple segments for each color. In this embodiment, color wheel 109 has 16 segments, which are equal in size. Four segments are red, four are blue, and eight are green.

Figure 6B:
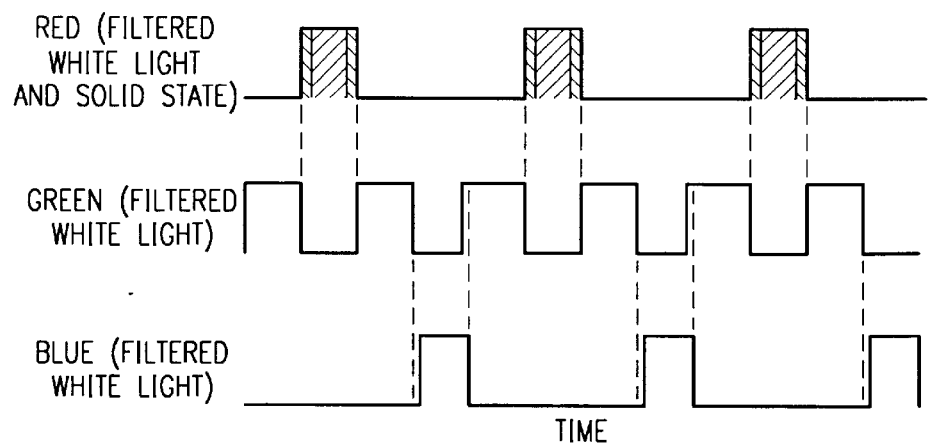
FIG. 6B illustrates the timing of the illumination provided by the color wheel of FIG. 6A, augmented with a solid state light source.

FIG. 6B illustrates the timing of the illumination provided by system 20 using the color wheel 109 of FIG. 6A. As illustrated, red light is augmented using a solid state light-source. In the example of FIG. 6B, the red light is "behind" the color wheel 109 as in the configuration of FIG. 2, and also compensates for the spoke times on both sides of the red segments. In other words, the solid state source is on during the entire time that red light is transmitted through the color wheel 109, as well as during the transition time before and after the red segments.

Augmentation of Multiple Colors

As indicated above, solid state sources can be used to augment more than one color. This can be achieved with either the configuration of FIG. 1 or FIG. 2.

For example, when red augmentation is achieved with a solid state source, the green light may be increased without adversely affecting overall color balance. In the example of FIG. 6A and 6B, the total duration of green light per revolution is doubled relative to the other colors. This permits the total lumens for the display on SLM 120 to be increased for higher image brightness.

Multiple SLM Display Systems with Solid State Augmentation for Lamp Deficiency

As stated in the Background, the use of three SLMs is an alternative to a color wheel in generating color displays. The images for each color are generated concurrently rather than sequentially. Or, a two-SLM system can be implemented in which one SLM is used with a color wheel to sequentially generate two images for two colors and a second SLM is used without a color wheel to concurrently generate a third color image. In both cases, the outputs from the SLMs are overlaid to provide a full color image.

Figure 7:
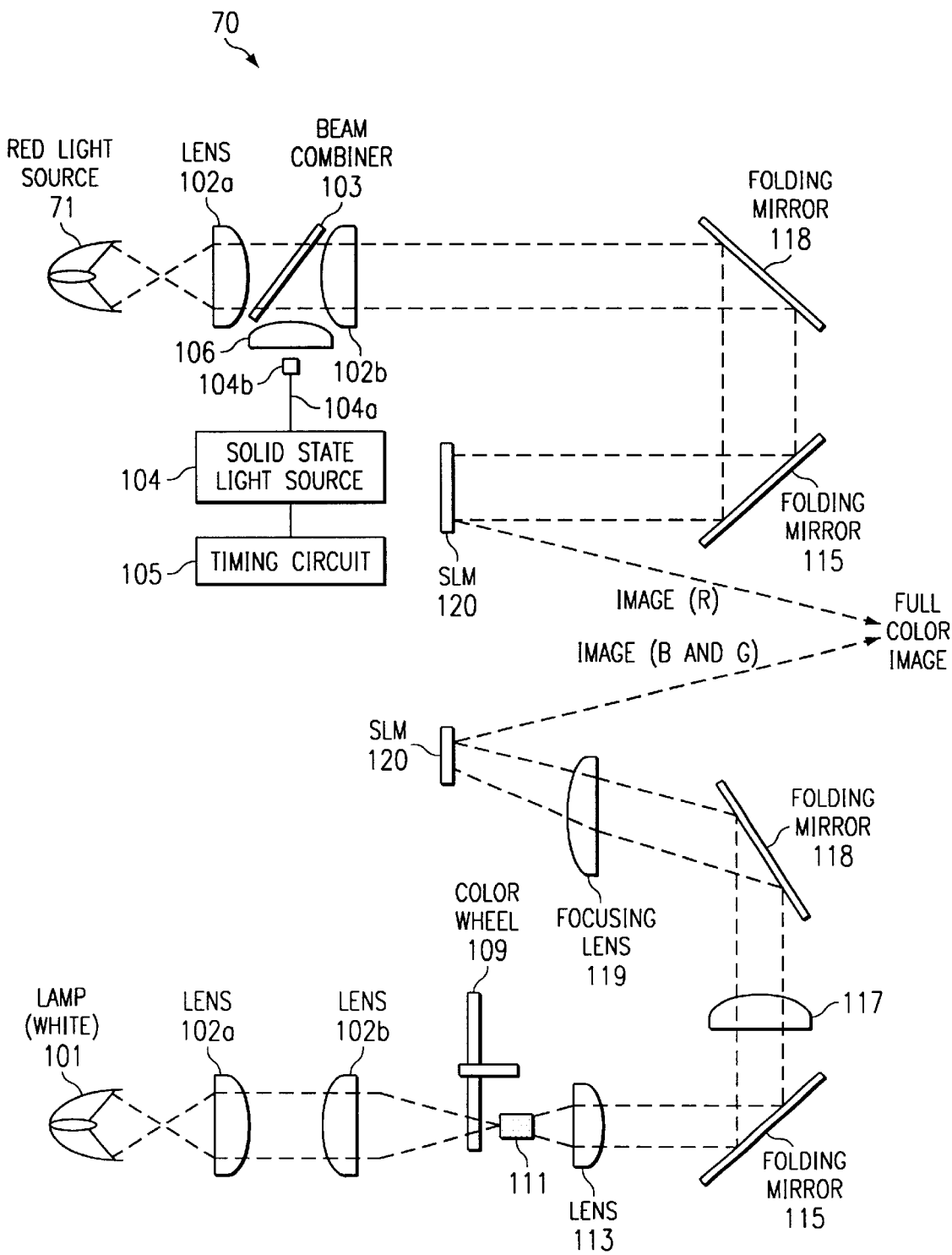
FIG. 7 illustrates a portion of an SLM-based display that uses two SLMs.

FIG. 7 illustrates an example of a "two-chip" display system 70 that used multiple SLMs 120 to generate the display. The same concepts as described above may be used to augment any of the colors. In the example of FIG. 7, a solid state light source 104 is used to augment the light from the SLM 120 generating the red image. The light source 71 for the red image may be a red lamp or other light source such as an LED, or a red-filtered light source.

In a "three-chip" system, each color is generated by a different SLM 120. Thus, there would be three light paths to the image plane, each providing a differently colored image. Each SLM 120 is illuminated by a differently colored light source 71. Each would have an optical path similar to that of the red SLM 120 of FIG. 7. Any one or more of the image could be augmented with a solid state light source 104 of the appropriate color.

Other Embodiments

Although the present invention has been described in detail, it should be understood that various changes, substitutions, and alterations can be made hereto without departing from the spirit and scope of the invention as defined by the appended claims.

What is claimed is:

1. An illumination system for a spatial light modulator, comprising:
   a white light source that provides white light in the visible spectrum;
   a solid state light source for providing light in a desired spectral region;
   a beam combiner for combining a beam of light from the white light source with light from the solid state light source, thereby providing augmented illumination;
   a color wheel having multiple color segments, for filtering the augmented illumination; and
   at least one lens for focussing the light from the white light source and the light from the solid state light source along an optical path to the spatial light modulator.

2. The system of claim 1, further comprising additional solid state light sources for augmenting additional spectral regions of visible light.

3. The system of claim 1, further comprising at least one mirror for folding the optical path.

4. The system of claim 1, further comprising timing circuitry for switching the solid state light source at least one per revolution of the color wheel.

5. The system of claim 1, further comprising timing circuitry for switching the solid state source at segment transitions.

6. A method of augmenting illumination for a spatial light modulator, comprising the steps of:
   providing a beam of white light source in the visible spectrum;
   augmenting the beam of white light with light from a solid state light source that provides light in a desired spectral region, thereby providing augmented illumination;
   filtering the augmented illumination with a color wheel having multiple filter segments, thereby providing filtered and augmented illumination; and
   focussing the filtered and augmented illumination on the spatial light modulator.

7. The method of claim 6, wherein the augmenting step is repeated for more than one spectral region.

8. The method of claim 6, further comprising the step of switching the solid state light source during revolutions of the color wheel.

9. The method of claim 6, further comprising the step of switching the solid state light source at transitions of the color wheel.

10. The method of claim 6, further comprising the step of switching the solid state light source to coincide with one or more segments of the color wheel.

11. An illumination system for a spatial light modulator, comprising:
   a white light source that provides white light in the visible spectrum;
   a color wheel having multiple color segments, for filtering the light from the white light source, thereby providing filtered illumination;
   a solid state light source for providing light in a desired spectral region;
   a beam combiner for combining a beam of light from the solid state light source with the filtered illumination, thereby providing augmented illumination; and
   at least one lens for focussing the light from the white light source and the light from the solid state light source along an optical path to the spatial light modulator.

12. The system of claim 11, further comprising additional solid state light sources for augmenting additional spectral regions of visible light.

13. The system of claim 11, further comprising at least one mirror for folding the optical path.

14. The system of claim 11, further comprising timing circuitry for switching the solid state light source at least one per revolution of the color wheel.

15. The system of claim 11, further comprising timing circuitry for switching the solid state source at segment transitions.

16. A method of augmenting illumination for a spatial light modulator, comprising the steps of:
   providing a beam of white light source in the visible spectrum;
   filtering the white light with a color wheel having multiple filter segments, thereby providing filtered illumination;
   augmenting the filtered illumination with light from a solid state light source that provides light in a desired spectral region, thereby providing filtered and augmented illumination; and
   focussing the filtered and augmented illumination on the spatial light modulator.

17. The method of claim 16, wherein the augmenting step is repeated for more than one spectral region.

18. The method of claim 16, further comprising the step of switching the solid state light source during revolutions of the color wheel.

19. The method of claim 16, further comprising the step of switching the solid state light source at transitions of the color wheel.

20. The method of claim 16, further comprising the step of switching the solid state light source to coincide with one or more segments of the color wheel.

21. An illumination system for at least one spatial light modulator of a display system having two or more spatial light modulators, comprising:
   a color light source that provides light in a color region of the visible spectrum;
   a solid state light source for providing light in all or part of the color region;
   a beam combiner for combining a beam of light from the color light source with light from the solid state light source, thereby providing augmented illumination; and
   at least one lens for focussing the light from the color light source and the light from the solid state light source along an optical path to the spatial light modulator.

22. The system of claim 21, further comprising a white light source, a second solid state light source for a second color, a second beam combiner, and a second lens for providing augmented illuminated of a second color to a second spatial light modulator, and further comprising a color wheel having multiple color segments for filtering the augmented illumination to the second spatial light modulator.

23. The system of claim 21, further comprising a second and a third colored light source for a second and third color, a second and third solid state light source for the second and third color, a second and third beam combiner, and a second and third lens for providing augmented illumination to a second and third spatial light modulator, respectively.

* * * * *